(12) United States Patent
Mizuo et al.

(10) Patent No.: US 7,119,887 B2
(45) Date of Patent: Oct. 10, 2006

(54) OPTICAL DISTANCE MEASURING SENSOR AND SELF-PROPELLED CLEANER

(75) Inventors: Kazuhiro Mizuo, Kashihara (JP);
Akifumi Yamaguchi, Kashiba (JP);
Shinya Kawanishi, Tenri (JP); Atsuo Fujikawa, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/158,082

(22) Filed: Jun. 22, 2005

(65) Prior Publication Data
US 2006/0050263 A1    Mar. 9, 2006

(30) Foreign Application Priority Data
Jun. 25, 2004    (JP) .......................... P2004-188091

(51) Int. Cl.
*G01C 3/08*    (2006.01)
(52) U.S. Cl. .................. 356/5.01; 356/4.01; 356/3.01; 356/3.1
(58) Field of Classification Search ................ 356/5.01
See application file for complete search history.

(56) References Cited
U.S. PATENT DOCUMENTS

| | | | | |
|---|---|---|---|---|
| 5,701,004 A | * | 12/1997 | Nakaya | 250/207 |
| 5,995,206 A | * | 11/1999 | Morinaka et al. | 356/4.01 |
| 2002/0097404 A1 | * | 7/2002 | Waslowski et al. | 356/623 |
| 2003/0184725 A1 | * | 10/2003 | Takaoka et al. | 356/3 |
| 2003/0229421 A1 | * | 12/2003 | Chmura et al. | 700/245 |

FOREIGN PATENT DOCUMENTS

JP    2002-350555 A    12/2002

* cited by examiner

*Primary Examiner*—Thomas H. Tarcza
*Assistant Examiner*—Luke D. Ratcliffe
(74) *Attorney, Agent, or Firm*—Birch, Stewart, Kolasch & Birch, LLP

(57) ABSTRACT

An optical distance measuring sensor has a plurality of light-emitting elements, a light-emitting lens, a photodetector having a light-receiving surface, a light emission driving part to sequentially drive the light-emitting elements, and a distance signal outputting part. Light emitted from each light-emitting element passes through the light-emitting lens, then is reflected by an object to be detected, and then gets incident on the light-receiving surface of the photodetector, which outputs a signal corresponding to a position of the incident light in the light-receiving surface. Upon receipt of the signal, the distance signal outputting part outputs a distance signal representing a distance to the object.

12 Claims, 9 Drawing Sheets

OPTICAL DISTANCE MEASURING SENSOR AND SELF-PROPELLED CLEANER

This nonprovisional application claims priority under 35 U.S.C. §119(a) on patent application Ser. No. 2004-188091 filed in Japan on 25 Jun. 2004, the entire contents of which are hereby incorporated by reference.

BACKGROUND OF THE INVENTION

1. Field of the Invention

The present invention relates to an optical distance measuring sensor that detects the presence of an object in a prescribed range and a direction in which the object is located and measures a distance to the object. The present invention also relates to a self-propelled cleaner incorporating such a sensor.

2. Description of the Related Art

Conventionally, pyroelectric sensors, ultrasonic sensors, reflection type infrared sensors, infrared distance measuring sensors and so on have been used as sensors intended to detect human bodies and objects, and combinations of some of those different sensors are also used.

As a sensor of the kind, a sensor device including a pyroelectric sensor and an infrared sensor has been proposed. The sensor device detects a human body by the pyroelectric sensor, and then, by the infrared sensor, detects a direction in which the human body is located and measures a distance to the human body (refer to, for example, JP 2002-350555 A). In this sensor device, because the infrared sensor has a detection range narrower than that of the pyroelectric sensor, it has been proposed to detect the direction and the distance of the human body by making the infrared sensor mechanically scan the detection range. Moreover, it has been proposed to use a plurality of infrared sensors in order to cover a detection range roughly equal to the detection range of the pyroelectric sensor.

However, making the infrared sensor mechanically scan the range raises a problem that noises are generated by the mechanical scanning movement and a problem that the responsiveness is comparatively low because of the mechanical scan. This arrangement has a further problem that long-term stability of the sensor device is comparatively poor because of the required maintenance of the scan mechanism.

Using a plurality of infrared sensors has a problem that the sensor device has an increased size, so that apparatuses to be equipped with the sensor device are limited. This arrangement has a further problem that the manufacturing cost is increased due to an increase in parts count. Also, there may occur stray light and difficulties in emitting parallel light depending on the mounting state of the plurality of infrared sensors. These problems cause a disadvantage that the accuracy of the measurement value is lowered. This arrangement also has a problem that every time a light source is switched to another to switch the infrared ray emissions, a period of an irregular output is generated, so that the distance measuring operation takes much time as a whole. Also, there is another problem that the measurement accuracy is prone to be lowered due to susceptibility to the influence of electromagnetic waves.

SUMMARY OF THE INVENTION

An object of the present invention is to provide an optical distance measuring sensor which generates little or no noise, has comparatively satisfactory long-term stability and comparatively high measurement accuracy and is able to be reduced in size and cost, and also to provide a self-propelled cleaner equipped with such a sensor.

In order to accomplish the above object, an optical distance measuring sensor according to the present invention includes:

a plurality of light-emitting elements that emit light;

one lens that transmits light emitted from the plurality of light-emitting elements;

a photodetector having a light-receiving surface on which light passed through the lens and reflected on an object to be detected is incident, the photodetector outputting a signal corresponding to a position of the incident light in the light-receiving surface;

a light emission driving part that drives the plurality of light-emitting elements; and a distance signal outputting part that receives a signal from the photodetector and outputs a distance signal representing a distance to the object to be detected.

According to the construction, the light beams going out of the plurality of light-emitting elements are guided through the one lens to the object to be detected. Reflected light, which is reflected on the object to be detected, is made incident on the light-receiving surface of the photodetector. Upon receiving a signal from the photodetector, the distance signal outputting part outputs a distance signal that represents the distance to the object to be detected. The optical distance measuring sensor passes the light beams going out of the plurality of light-emitting elements through the one lens, and therefore, size and cost reductions can be achieved as compared with the case in which the same number of lenses as the number of the light-emitting elements are provided.

In one embodiment, the optical distance measuring sensor has a detection range determined by the number of the light-emitting elements.

According to the embodiment, the detection range can be set to a prescribed area by setting the number of the light-emitting elements.

The "detection range" means a range in which an object to be detected may be located and the optical distance measuring sensor can detect the distance and the direction of the object from the sensor.

In one embodiment, the optical distance measuring sensor has a viewing angle determined by a distance between the light-emitting elements.

According to the embodiment, the viewing angle can be set to a prescribed dimension by setting the distance between the light-emitting elements.

The "viewing angle" means an angle that covers a range in which the light beams go out of the lens.

In one embodiment, the optical distance measuring sensor has a detection range determined by a distance between the light-emitting elements and the photodetector.

According to the embodiment, the detection range can be set to a prescribed area by setting the distance between the light-emitting elements and the photodetector. For example, a distance to the boundary of the detection range in the axial direction of the lens can be set to a prescribed value.

In one embodiment, the optical distance measuring sensor further includes:

a light-permeable first sealing portion that seals the plurality of light-emitting elements; and a non-light-permeable second sealing portion that covers a portion of a surface of the first sealing portion other than a portion at which light paths extending from the plurality of light-emitting elements to the lens meet the surface of the first sealing portion.

According to the embodiment, among the light beams from the plurality of light-emitting elements sealed by the first sealing portion, light that travels along a path other than paths extending from the light-emitting elements to the lens is blocked by the second sealing portion. With this arrangement, stray light, which is emitted from the light-emitting elements but does not contribute to the distance measuring operation, is effectively prevented from leaking to the lens.

The second sealing portion may preferably define a slit-shaped aperture on the surface of the first sealing portion.

In one embodiment, the first sealing portion has lens-shaped portions through which light beams from the corresponding light-emitting elements go outward.

According to the embodiment, the light beams from the plurality of light-emitting elements are condensed by the respective lens-shaped portions of the first sealing portion. Therefore, light of sufficient intensity enters the one lens, and an increased detection accuracy of the distance of the object to be detected is obtained.

In one embodiment, the optical distance measuring sensor includes a timing signal outputting part that outputs a timing signal having a prescribed cycle. The light emission driving part drives a selected one of the light-emitting elements to emit light in synchronization with the timing signal, and the distance signal outputting part outputs the distance signal in synchronization with the timing signal.

According to the embodiment, a distance signal and a light-emitting element that is a light source of reflected light from which the distance signal has been obtained can be linked to each other. Therefore, the position of the object to be detected can be determined on the basis of the direction thereof from the light-emitting element and the distance obtained from the distance signal.

In one embodiment, the optical distance measuring sensor includes an initialization signal outputting part that outputs an initialization signal at a timing for switching the light emission among the light-emitting elements. Upon receipt of the initialization signal, the timing signal outputting part initializes the output of the timing signal, and upon receipt of the initialization signal, the light emission driving part switches the light-emitting element that should be driven to emit light among the light-emitting elements.

Upon receiving the initialization signal from the initialization signal outputting part, the timing signal outputting part initializes the output of the timing signal. As a result, a timing signal different from the previous timing signal, which was generated before receiving the initialization signal, is newly outputted in accordance with timing different from that of the timing signal. Moreover, upon receiving the initialization signal, the light emission driving part switches the light-emitting element being driven to a next one. The newly selected light-emitting element is driven to emit light by the light emission driving part in synchronization with the newly outputted timing signal. Therefore, the newly selected light-emitting element can promptly emit light in the prescribed cycles. On the other hand, a distance signal corresponding to the newly selected light-emitting element is outputted from the distance signal outputting part in synchronization with the newly outputted timing signal. Thus, the period of indeterminate output occurring from the switching of the light-emitting elements to be driven for light emission to the output of a distance signal corresponding to the newly selected light-emitting element is made shorter than in the conventional case. As a result, time necessary for the switching of the light-emitting elements can be shortened, and the distance measuring operation by the plurality of light-emitting elements can be performed at a higher speed.

In one embodiment, the optical distance measuring sensor has a casing which is formed of a conductive material and in which at least the light-emitting elements, the photodetector, the light emission driving part and the distance signal outputting part are contained.

According to the embodiment, influence of external electromagnetic waves on the light-emitting elements, the photodetector, the light emission driving part and the distance signal outputting part is reduced and the generation of electromagnetic noises can be prevented. As a result, an optical distance measuring sensor of high accuracy and high reliability is obtained.

In one embodiment, the optical distance measuring sensor has a board which has a grounding electrode and on which at least the light-emitting elements, the photodetector, the light emission driving part and the distance signal outputting part are mounted. The grounding electrode of the board is electrically connected to the casing.

According to the embodiment, with regard to the board on which the light-emitting elements, the photodetector, the light emission driving part and the distance signal outputting part are mounted, the grounding electrode of the board is allowed to have the same electrical potential as that of the casing. Therefore, the generation of electromagnetic noises can effectively be prevented.

In one embodiment, the optical distance measuring sensor includes a pyroelectric sensor.

According to the embodiment, by detecting an object by means of the pyroelectric sensor, it can be discriminated whether the object detected is a human body or an article.

A self-propelled cleaner according to the present invention includes the above-described optical distance measuring sensor.

According to the construction, due to the provision of the optical distance measuring sensor, the self-propelled cleaner can be reduced in size and cost.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1A:
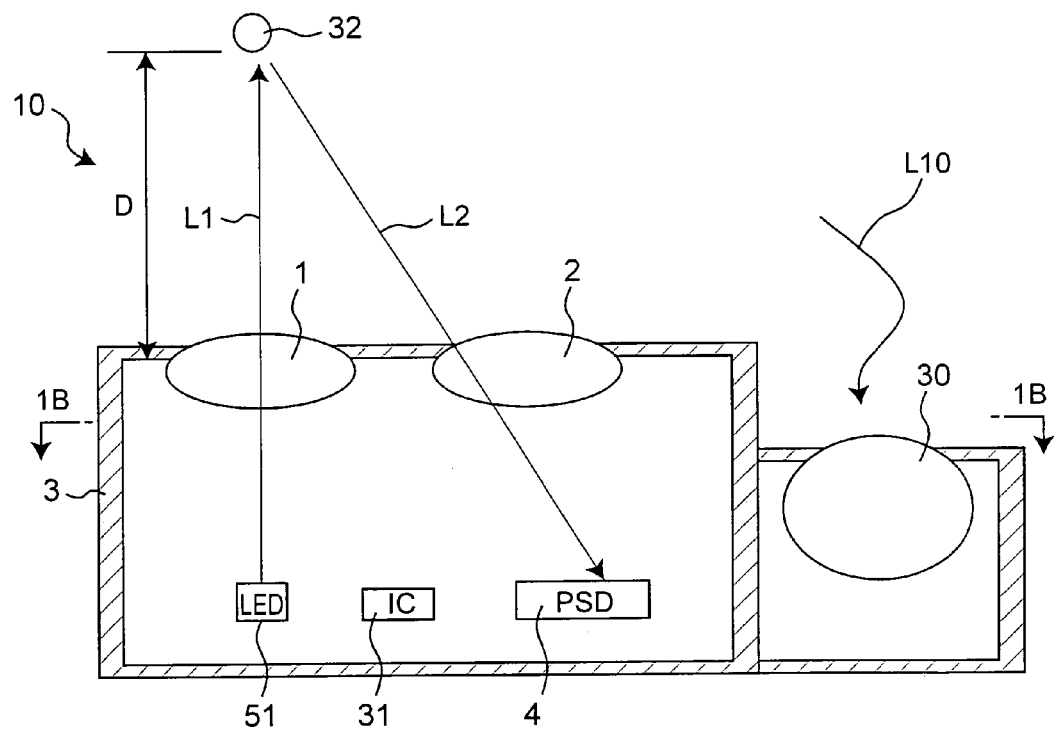
FIG. 1A is a schematic cross-sectional view showing a multi-beam distance measuring sensor as an optical distance measuring sensor according to an embodiment of the present invention.

The present invention will be described in detail below by the embodiments thereof shown in the drawings.

Figure 1B:
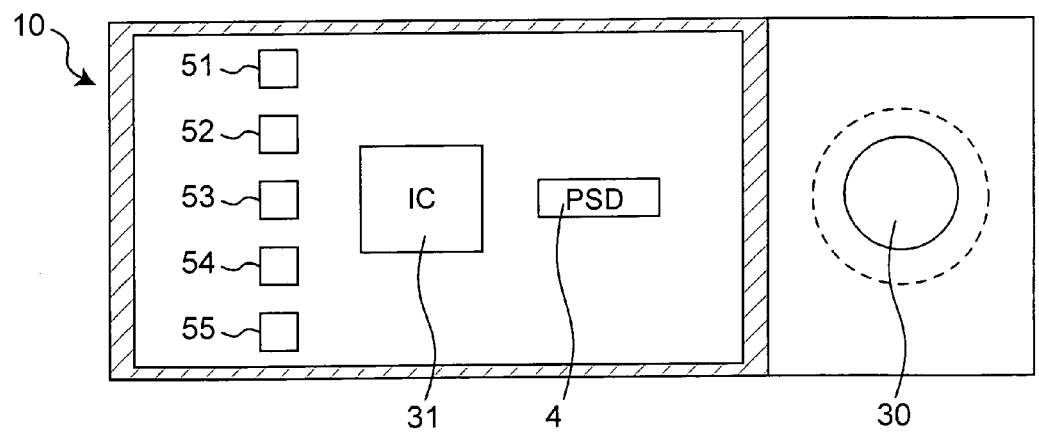
FIG. 1B is a sectional view taken along line 1B-1B of FIG. 1A.

FIG. 1A is a schematic cross-sectional view showing a multi-beam distance measuring sensor as the optical distance measuring sensor of the present invention. FIG. 1B is a sectional view taken along line 1B—1B of FIG. 1A. The multi-beam distance measuring sensor 10 includes five LEDs (light emitting diodes) 51, 52, 53, 54 and 55 as light-emitting elements that emit infrared rays, and a PSD (position sensitive detector) 4 as a photodetector. One light-emitting lens 1, which receives incident light from the LEDs 51–55 and emits parallel light, is provided in a position opposing the LEDs 51–55. The light-emitting lens 1 consists of a circular lens. A light-receiving lens 2 for condensing light from an object to be detected 32 on the PSD 4 is provided in a position roughly opposing the PSD 4. The light-receiving lens 2 consists of a toroidal lens. The LEDs 51–55 and the PSD 4 are electrically connected to an IC (integrated circuit) 31.

The multi-beam distance measuring sensor 10 applies a near-infrared beam L1 from the LED 51 . . . 54, or 55 to the object 32 to be detected via the light-emitting lens 1 and receives, by the PSD 4, reflected light L2 coming from the object 32 to be detected through the light-receiving lens 2, as in a conventional optical distance measuring sensor using a triangulation method. A distance to the object 32 to be detected is measured on the basis of a light-receiving position in the light-receiving portion of the PSD 4 at which the reflected light is received.

Figure 2A:
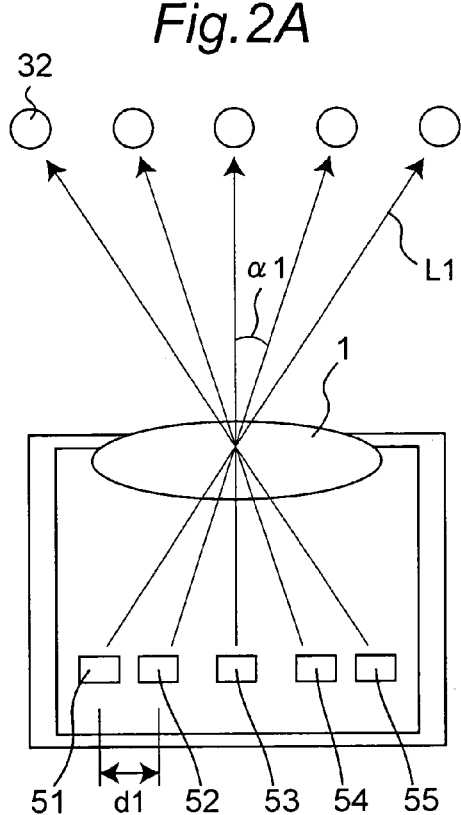
FIGS. 2A, 2B and 2C are schematic views for explaining the principle of measuring a distance to an object to be detected.
Figure 2B:
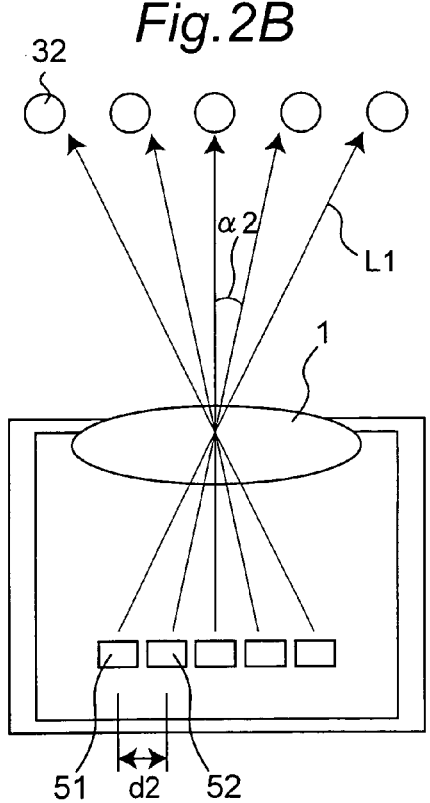
Figure 2C:
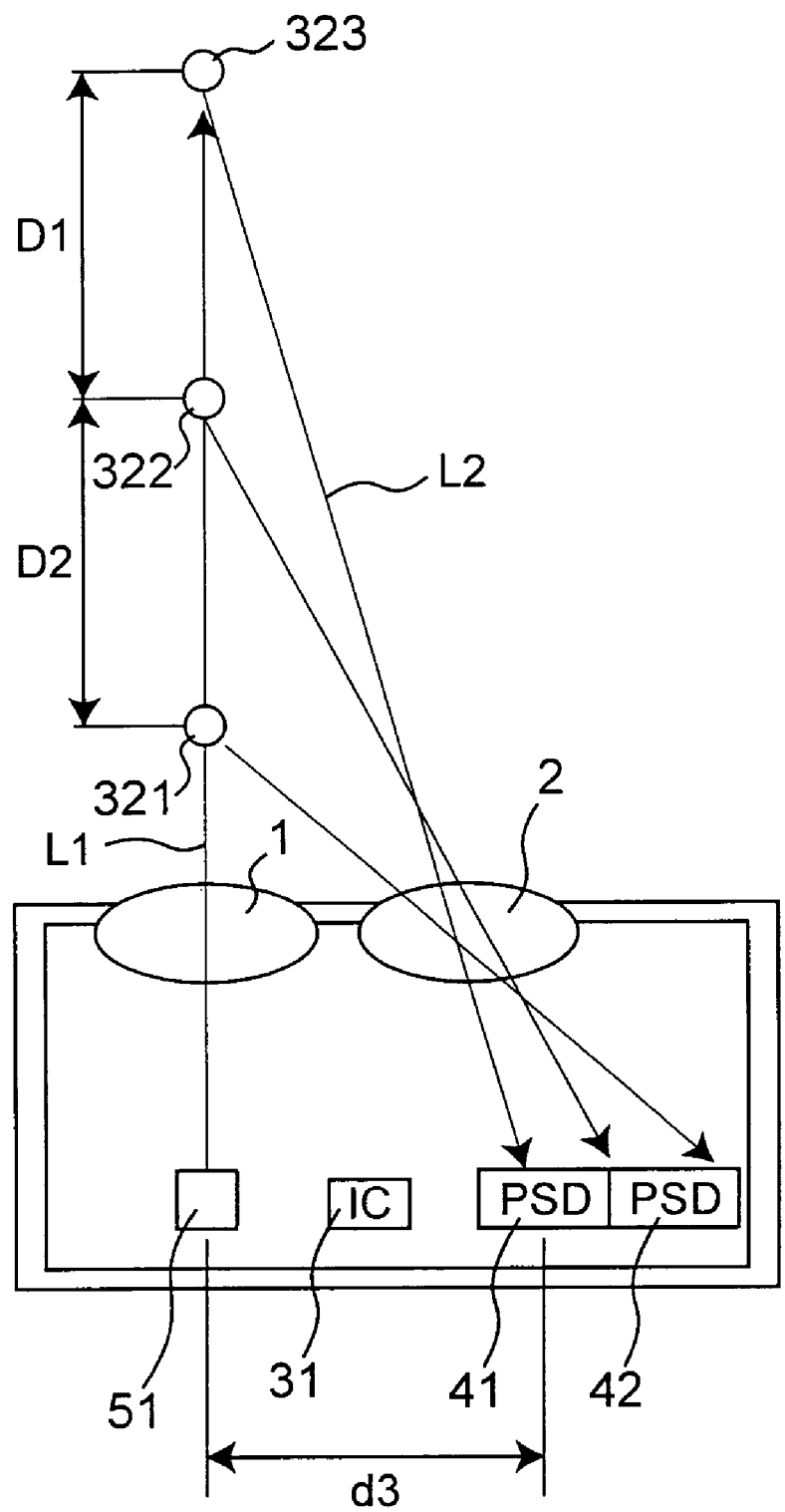

FIGS. 2A, 2B and 2C are schematic views for explaining the principle of measuring the distance to the object 32 to be detected.

The five LEDs 51–55 are arranged in a direction roughly perpendicular to a direction in which the center of the light-emitting lens 1 is aligned with the center of the light-receiving lens 2. The center LED 53 is positioned such that the optical axis of LED 53 approximately coincides with the center axis of the light-emitting lens 1. With this arrangement, as shown in FIG. 2A, a near-infrared beam L1 can be emitted in a direction of, for example, an angle α with respect to the axis of the light-emitting lens 1 in addition to the axial direction of the light-emitting lens 1. Further, by employing a toroidal lens for the light-receiving lens 2, reflected light L2 coming from any portion other than the front of the light-receiving lens 2 is made incident on the light-receiving portion of the single PSD 4.

Although five LEDs 51–55 are provided with respect to the one light-emitting lens 1 in FIG. 2A, the number of the LEDs can be increased or decreased. By setting the number of the LEDs to a prescribed number, a plurality of near-infrared beams L1 can be emitted in the axial direction of the light-emitting lens 1 and also in directions angled to the axial direction. Therefore, a detection range, which is a range in which near-infrared beams L1 are applied and the distance and direction of the object 32 to be detected can be detected, can be set to a desired area by adjusting the number of the LEDs.

The angle α1 between adjoining near-infrared beams L1 emitted from the light-emitting lens 1 can be set according to the positional relation between the LEDs 51–55 and the light-emitting lens 1. For example, when the distance (pitch) between the adjacent LEDs 51–55 is d1 in FIG. 2A, the angle between the adjoining near-infrared beams L1 from the light-emitting lens 1 is α1. By reducing the distance between the LEDs 51–55 from d1 to d2 as shown in FIG. 2B without changing the distance from the array of LEDs 51–55 to the light-emitting lens 1 (namely, the distance between the center LED 53 and the center of the lens 1), the angle between the adjoining near-infrared beams L1 can be reduced from α1 to α2. Therefore, by setting the distance between the plurality of LEDs 51–55, the size of the viewing angle of the multi-beam distance measuring sensor 10 can be set. Moreover, the size of the viewing angle of the multi-beam distance measuring sensor 10 can also be changed by changing the distance from the array of LEDs 51–55 to the light-emitting lens 1 with the constant pitch of the LEDs 51–55. Moreover, distances between the adjacent LEDs 51–55 can be individually set.

FIG. 2C is a view showing an example in which two PSDs 41 and 42 are arranged in a direction roughly perpendicular to the direction in which the LEDs 51–55 are arranged. As shown in FIG. 2C, reflected light of a first object 321 to be detected located near the light-emitting lens 1 is incident on the PSD 42 located on the side far from the LED 51. Reflected light of a second object 322 to be detected, which is located a distance D2 more remote from the light-emitting lens 1 than the first object 321 to be detected, is incident on the PSD 42 at a position nearer to the LED 51 than the position at which the reflected light of the first object 321 is incident on the PSD 42. Further, reflected light of a third object 323 to be detected, which is located a distance D1 more remote from the light-emitting lens 1 than the second object 322 to be detected, is incident on the PSD 41 located on the side near the LED 51. Thus, by setting the distance between the LED 51 and the PSDs 41 and 42, the distance from the light-emitting lens 1 within the detection range can be set according to the principle of triangulation. It is needless to say that the triangulation can be performed with only one of the PSDs 41 and 42.

Figure 3A:
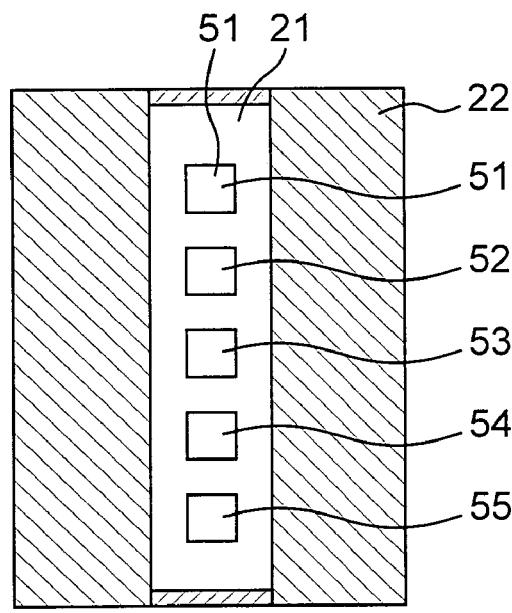
FIG. 3A is a plan view showing the mounting structure of a plurality of LEDs.
Figure 3B:
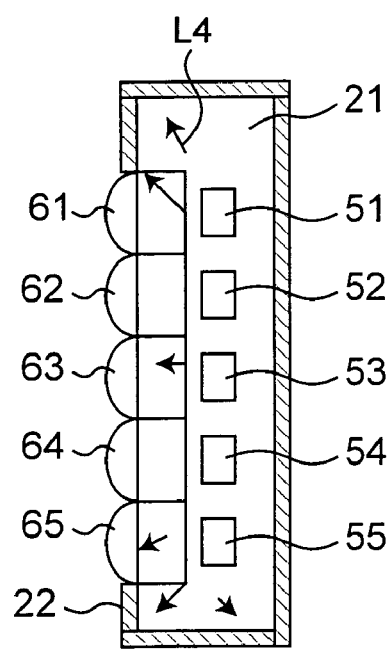
FIG. 3B is a sectional view showing the mounting structure of the plurality of LEDs.

FIGS. 3A and 3B are views showing the mounting structure of the LEDs 51–55. FIG. 3A is a plan view of the mounting structure of the LEDs 51–55 as viewed from the light-emitting side, and FIG. 3B is a sectional view of the mounting structure taken in a direction in which the LEDs 51–55 are arranged. The five LEDs 51–55 are covered with a primary mold 21 that serves as the first sealing portion and a secondary mold 22 that serves as the second sealing portion. The primary mold 21 is formed of a translucent, or light-permeable material that transmits the outgoing beams from the LEDs 51–55. The secondary mold 22 is formed of a non-light-permeable material that does not transmit the outgoing beams (the secondary mold 22 is hatched in the plan view of FIG. 3A for the sake of easy understanding). The non-translucent secondary mold 22 covers the primary mold 21 except for portions through which the light beams emitted from the LEDs 51–55 go outward. This arrangement produces a slit effect on the outgoing beams, thereby allowing stray light L4 to be confined in the primary mold 21 as shown in FIG. 3B.

Figure 4A:
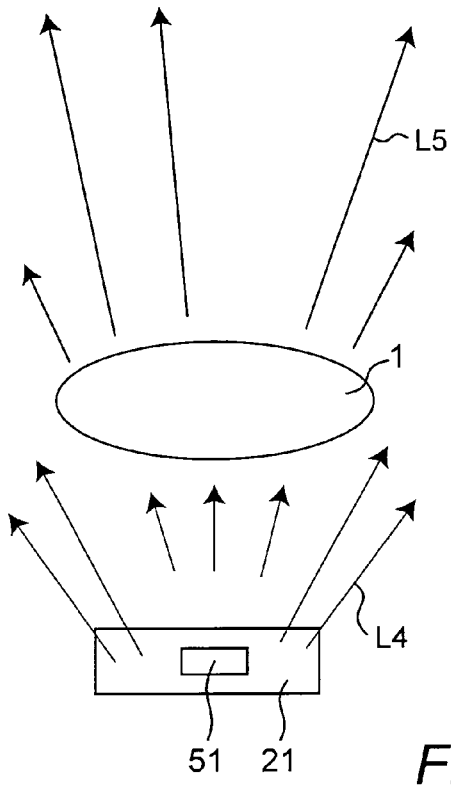
FIGS. 4A and 4B are views showing comparative examples of the LED mounting structure.
Figure 4B:
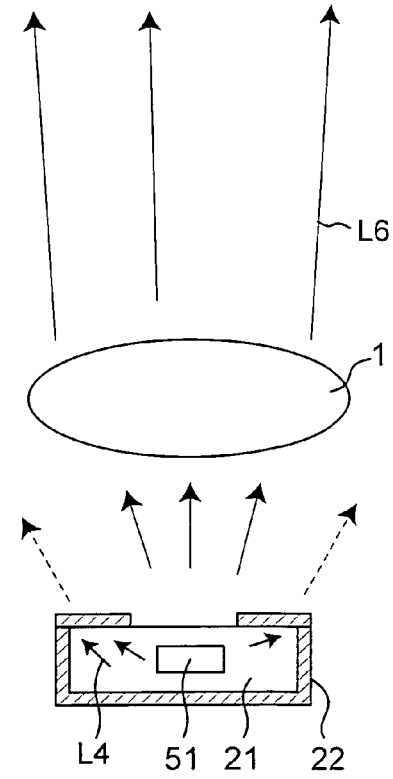

FIGS. 4A and 4B are views showing comparative examples of the LED mounting structure. As shown in FIG. 4A, when the light-emitting surface of the primary mold 21 is formed into a planar surface and no secondary mold is provided, the stray light L4 disadvantageously leaks outwardly of the LED mounting structure.

On the other hand, when the secondary mold is provided at portions of the primary mold 21 other than the light-emitting surface which is formed into a planar surface, as shown in FIG. 4B, the directivity angle of a beam L6 from the lens 1 becomes comparatively large since the directivity of the outgoing beam from the primary mold 21 is comparatively small, although the leak of the stray light 4 occurring in the case of FIG. 4A can be suppressed.

Figure 4C:
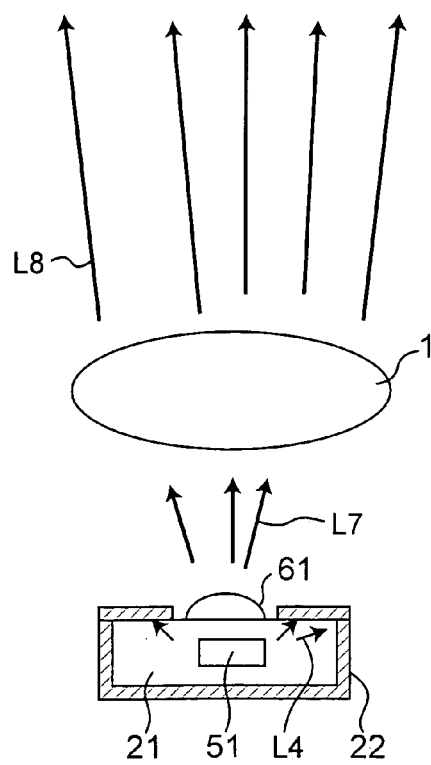
FIG. 4C is a view showing the LED mounting structure of the present embodiment.

In contrast to this, in the LED mounting structure of the multi-beam distance measuring sensor 10 of the present embodiment shown in FIG. 4C, light-emitting portions of the primary mold 21 are shaped into lens-shaped portions 61 through 65 (see FIG. 3B. Only lens-shaped portion 61 is shown in FIG. 4C), and the surface of the primary mold 21 except for the lens-shaped portions 61 through 65 is roughly entirely covered with the secondary mold 22. With this arrangement, outgoing beams from the LEDs 51–55 are efficiently condensed so that a beam L7, which has a comparatively small directivity angle and a large quantity of light, is guided to the light-emitting lens 1. Therefore, a beam L8, which is roughly parallel and has a large quantity of light, can be emitted from the light-emitting lens 1. In FIG. 4C, arrows indicating the beams L7 and L8 are drawn by thick lines in correspondence to the increased quantities of light.

As described above, by employing the translucent primary mold 21 that has the lens-shaped portions 61 through 65 and the secondary mold 22 that has a slit, the multi-beam distance measuring sensor 10 of the present embodiment is able to obtain the roughly parallel beam L8 that has a large quantity of light. As a result, the distance measurement accuracy is effectively improved.

Figure 5:
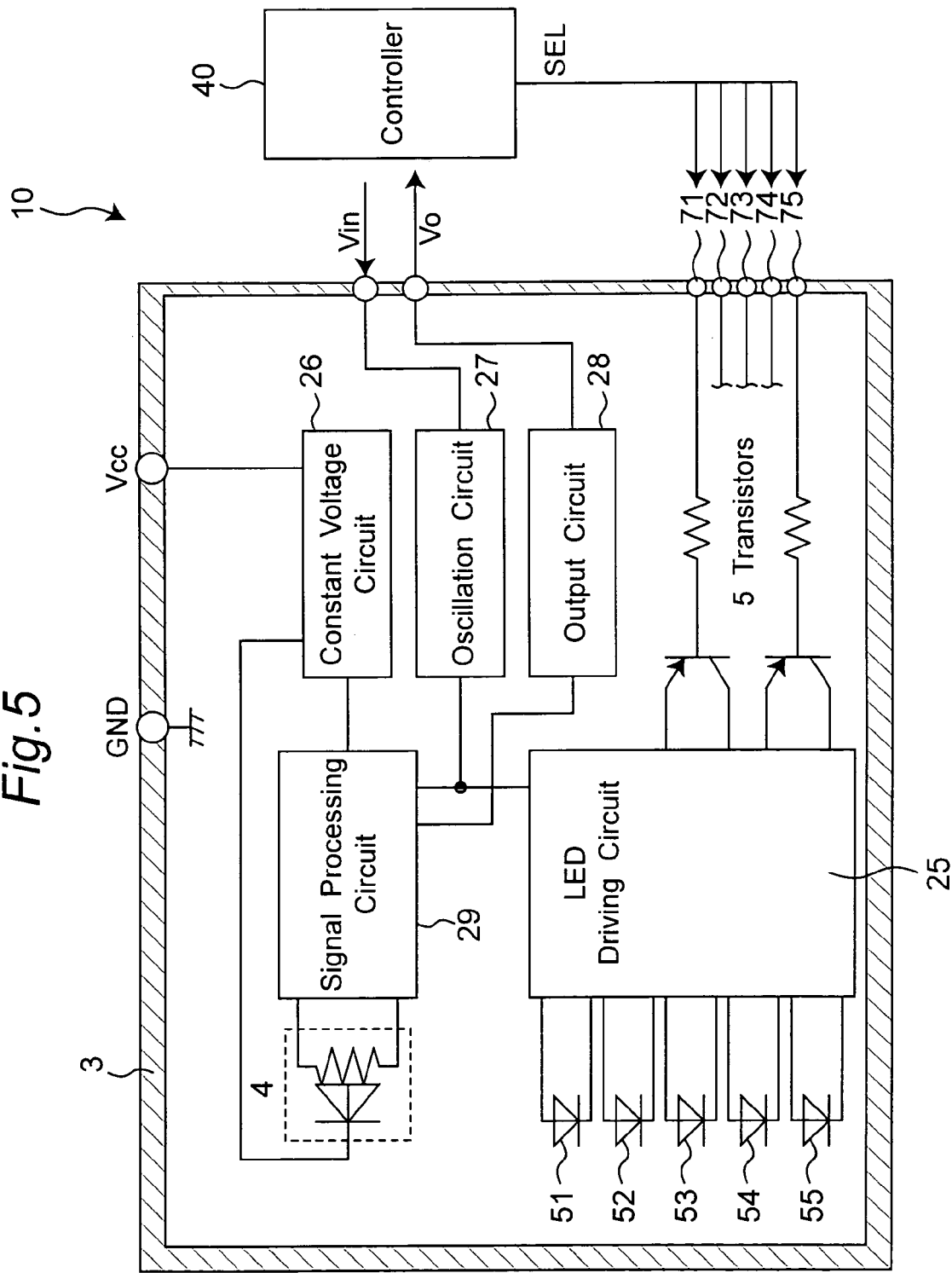
FIG. 5 is a block diagram showing an electric circuit of the multi-beam distance measuring sensor.

FIG. 5 is a block diagram showing the electric circuit of the multi-beam distance measuring sensor 10. The pyroelectric sensor 30 is omitted from FIG. 5.

The multi-beam distance measuring sensor 10 includes an LED driving circuit 25 that serves as a light emission driving part for driving the LEDs 51–55 and a signal processing circuit 29 that serves as a distance signal outputting part for processing the output of the PSD 4. The LED driving circuit 25 and the signal processing circuit 29 are constructed of the IC 31. The signal processed by the signal processing circuit 29 is outputted through an output circuit 28.

The LED driving circuit 25 is connected to five transistors that serve as switches for electrifying the LEDs 51–55, and each of the transistors is turned on and off by a selection signal SEL inputted through corresponding LED selection signal input terminals 71–75. The LED selection signal input terminals 71–75 are connected to a controller 40 located outside a casing 3, and the selection signal SEL is inputted from the controller 40.

The signal processing circuit 29, the PSD 4 and the LED driving circuit 25 are supplied with power by a constant voltage circuit 26 that is externally supplied with power via a power supply terminal Vcc and outputs driving power.

The signal processing circuit 29 and the LED driving circuit 25 are connected to an oscillation circuit 27 that serves as a timing signal outputting part, and operate in synchronization with a signal generated by the oscillation circuit 27.

The LEDs 51–55, the LED driving circuit 25, the PSD 4, the signal processing circuit 29, the constant voltage circuit 26, the oscillation circuit 27, the output circuit 28 and the transistors are accommodated in the casing 3 formed of a conductive material. Moreover, the LED driving circuit 25, the signal processing circuit 29, the constant voltage circuit 26, the oscillation circuit 27 and the output circuit 28 are mounted on a board, and the board is fixed to the casing 3 with conductive screws. The screws are put in contact with a GND (ground) electrode of the board.

The controller 40 placed outside the casing 3 supplies an initialization signal Vin to the oscillation circuit 27 and, on the other hand, receives from the output circuit 28 a distance signal Vo that represents the distance from the sensor to the object 32 to be detected. The controller 40 is constructed of a CPU (Central Processing Unit) of an apparatus in which the multi-beam distance measuring sensor 10 is installed.

The pyroelectric sensor 30 for detecting a human body is placed outside the casing 3.

Figure 6:
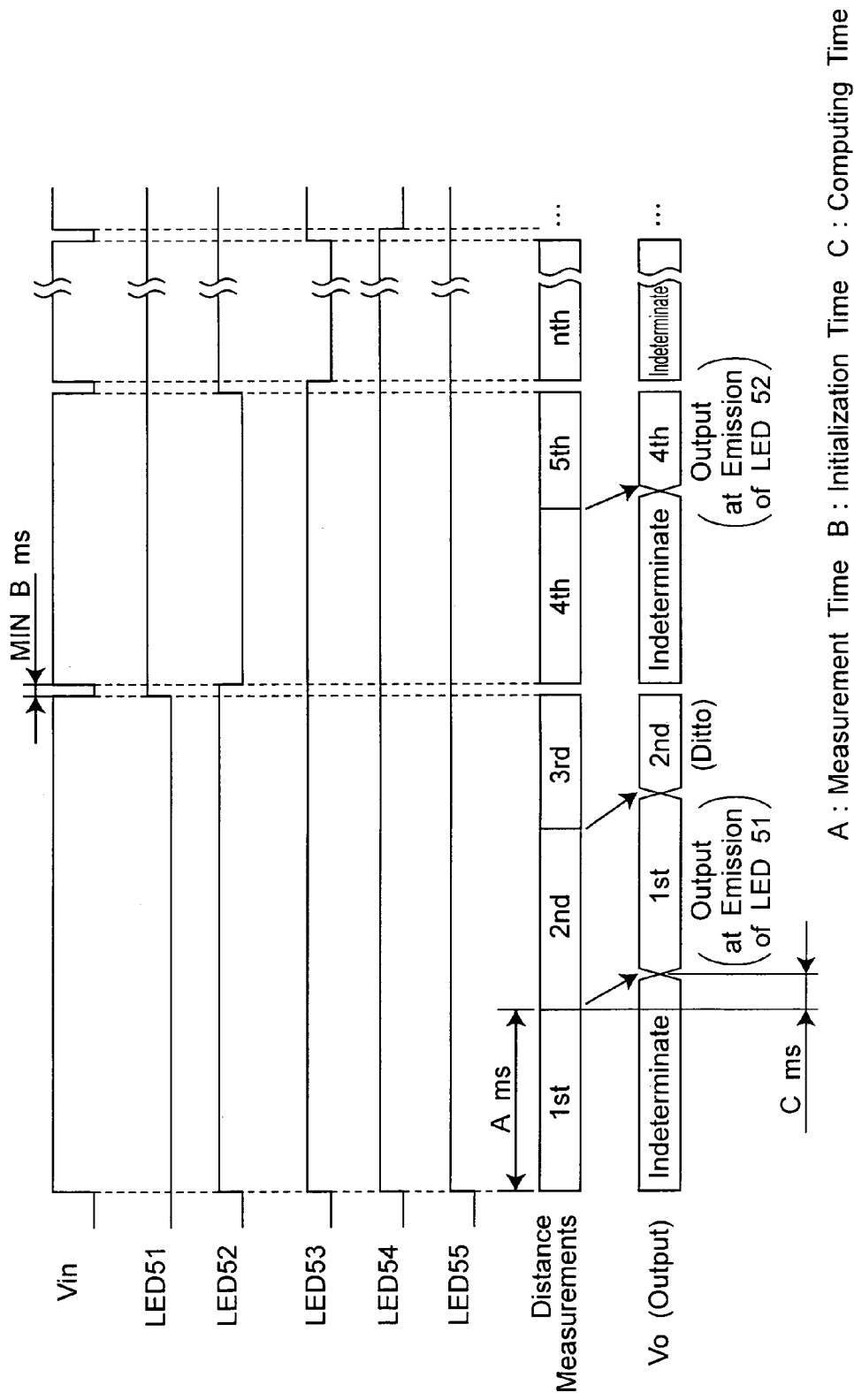
FIG. 6 is a timing chart showing a distance measuring operation of the multi-beam distance measuring sensor.

The distance measuring operation of the multi-beam distance measuring sensor 10 constructed as above will be described below with reference to the timing chart of FIG. 6. Note that signal waveforms indicated by LED 51-LED 55 in FIG. 6 are of the selection signals SEL supplied from the controller 40 to the corresponding LED selection signal input terminals 71–75. First of all, once the power is supplied from outside through the power Vcc supply terminal, the constant voltage circuit 26 starts the power supply operation, so that the IC 31 starts operating. Specifically, the LED driving circuit 25 in the IC 31 drives one LED (LED 51 in FIG. 6) selected from the LEDs 51–55 by the selection signal SEL to emit light, starting the distance measuring operation. Subsequently, another LED (LED 52 in FIG. 6) is driven to emit light, so that the distance measurement in a direction different from the direction of the first light emission is started. Subsequently, the other LEDs 51–55 are successively switched over to emit light, and the distance measuring operation in each direction is carried out by the outgoing beams from the LEDs 51–55.

In the distance measurements using the outgoing beams from the LEDs 51–55, the light emission timing of the LEDs 51–55 and the timing of signal output from the PSD 4 are synchronized with each other. By thus doing, the outgoing beam being used for the distance measurement is identified as to which one of the LEDs 51–55 the beam comes from. On the basis of the direction in which the identified LED 51 . . . 54, or 55 emits light as well as the output from the PSD 4, the IC 31 carries out the operation. In this way, the position of the detected object 32 is determined from both the direction and the distance of the object from the multi-beam distance measuring sensor 10.

More in detail, the LED driving circuit 25 drives the LED 51, 52, 53, 54, or 55 for carrying out the distance measurement to emit pulsed light n times (n is a natural number) in prescribed distance measuring periods or cycles in synchronization with pulse signals periodically generated by the oscillation circuit 27. The signal processing circuit 29 reads the signal from the PSD 4 at the timing in accordance with the light emission timing of the LED 51, 52, 53, 54, or 55 in synchronization with the pulse signal of the oscillation circuit 27. By comparing a reception light signal obtained when the LEDs 51–55 are emitting light with a reception light signal obtained when the LEDs 51–55 are not emitting light, a signal ascribed to disturbance light incident on the PSD 4 can be removed.

Upon receipt of the IC control signal Vin as the initialization signal from the controller 40 in switching the light emission of the LEDs 51–55, the operation of the distance measuring IC 31 is initialized. That is, the LED selection signal SEL is inputted to the LED selection signal input terminal 71–75, and the IC control signal Vin is inputted to the oscillation circuit 27. As a result, the oscillation circuit 27 ends the generation of the pulse signal used before the switching and starts oscillating for a new pulse signal. On the other hand, the signal processing circuit 29 reads a signal from the PSD 4 in synchronization with the new pulse signal and generates an output signal. Moreover, the LED driving circuit 25 starts driving the next LED 51–55 in synchronization with the new pulse signal. Thus, time required for the distance measuring operation can be shortened. As is apparent from above, the controller 40 functions as the initialization signal outputting part.

Figure 7:
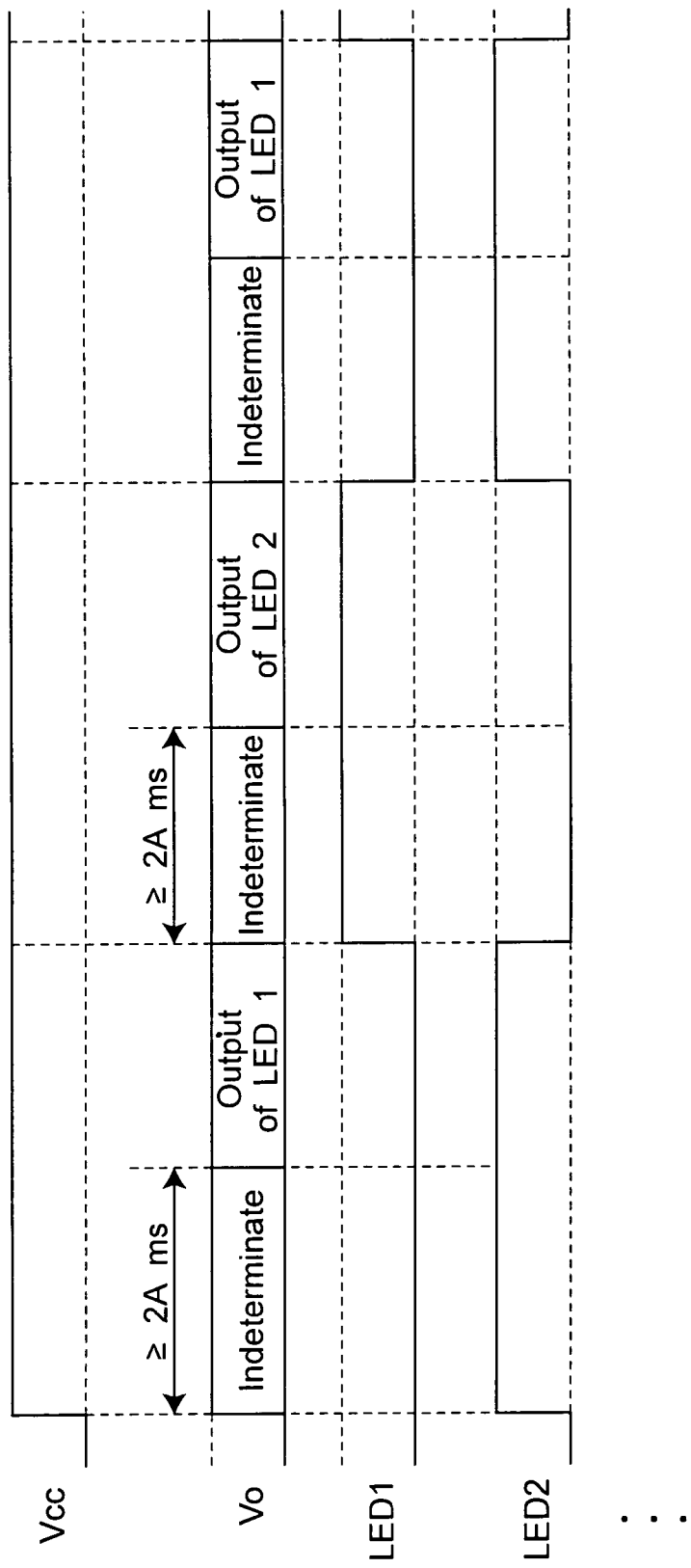
FIG. 7 is a timing chart showing a distance measuring operation of a comparative example.

FIG. 7 is a timing chart showing a comparative example in which the distance measuring operation is carried out without inputting the IC control signal Vin. As shown in FIG. 7, when the LED switching is performed without inputting the IC control signal Vin, the time during which the output is indeterminate is prolonged (2 A ms in FIG. 7), so that the time required for the distance measuring operation becomes prolonged. In contrast to this, in the present embodiment, due to the IC control signal Vin, the time during which the output is indeterminate, including even the initialization time B ms, is shortened (shortened from 2 A ms to 1 A ms), as shown in FIG. 6, and the LEDs 51–55 can be promptly switched over. Therefore, the distance measuring operation is achieved in a short time.

Moreover, the multi-beam optical distance measuring sensor of the present embodiment employs the casing 3 formed of a conductive material, and the casing 3 is electrically connected to the board with the conductive screws. With this arrangement, the GND of the electric circuit of the board and the casing 3 are allowed to have an equal electrical potential. As a result, electromagnetic waves are prevented from intruding from outside, and the generation of electromagnetic noises is prevented.

Moreover, the multi-beam optical distance measuring sensor of the present embodiment includes the pyroelectric sensor 30. Therefore, it is possible to detect not only the distance and the direction of the object 32 to be detected but also a far-infrared ray L10 from the object 32 to be detected. Therefore, whether the object 32 to be detected is a human body or an article can be discriminated with high accuracy without the influence of noises from outside.

Figure 8:
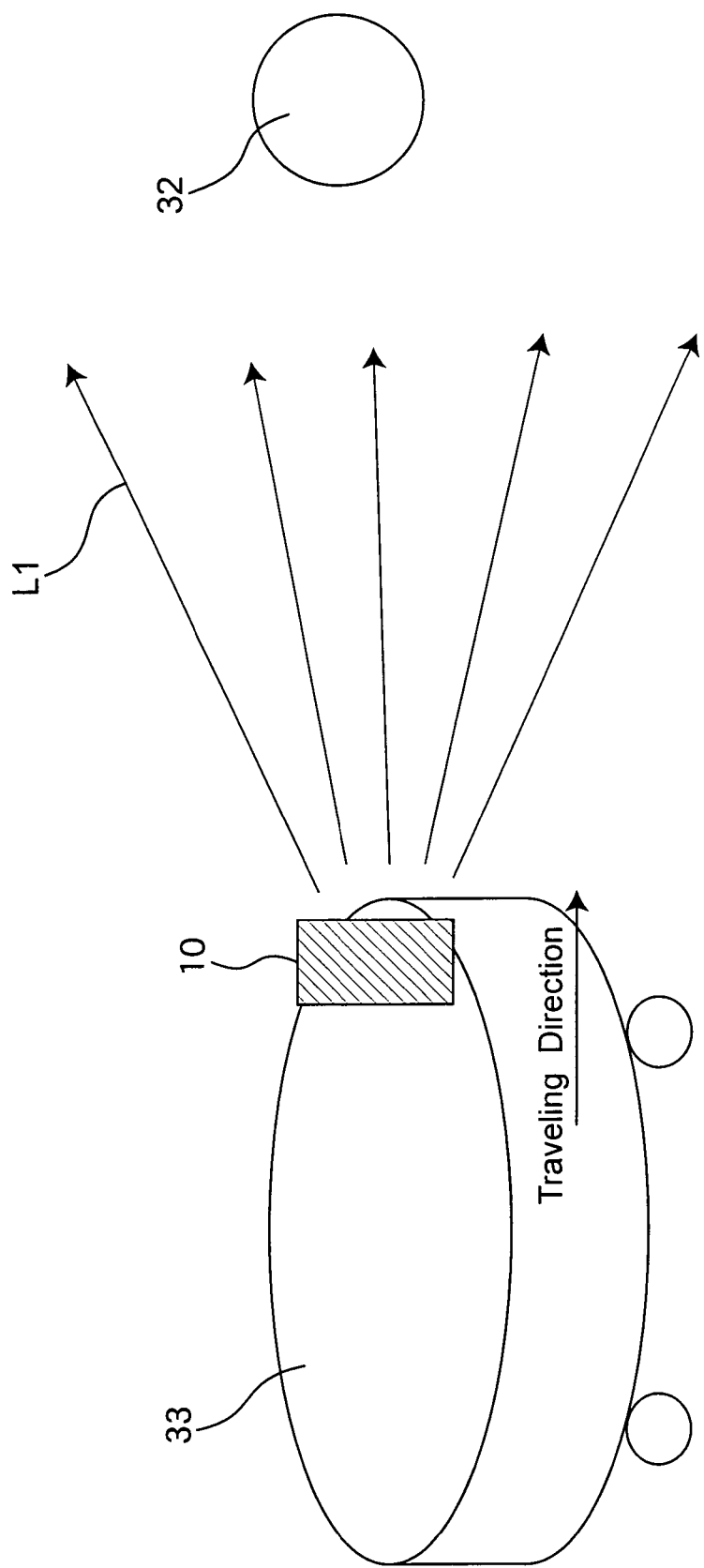
FIG. 8 is a diagram showing a self-propelled cleaner equipped with the multi-beam distance measuring sensor.

FIG. 8 is an illustration showing a self-propelled cleaner 33 equipped with the multi-beam distance measuring sensor 10. The self-propelled cleaner 33 is able to detect the shape of a room to be cleaned, positions and directions of obstacles around the cleaner, the presence or absence of a human body, and so on with high accuracy with little noise influence. Therefore, the cleaner can travel in the room effectively evading collision with the obstacle 32. Moreover, since the positions and the directions of the walls and the obstacles inside the room can be detected, cleaning is efficiently performed.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical distance measuring sensor, comprising:
   a plurality of light-emitting elements that emit light;
   one lens that transmits light emitted from the plurality of light-emitting elements;
   a photodetector having a light-receiving surface on which light passed through the lens and reflected on an object to be detected is incident, the photodetector outputting a signal corresponding to a position of the incident light in the light-receiving surface;
   a light emission driving part that drives the plurality of light-emitting elements;
   a distance signal outputting part that receives a signal from the photodetector and outputs distance signal representing a distance to the object to be detected;
   a timing signal outputting part that outputs a timing signal having a prescribed cycle to activate a selected one of the plurality of light-emitting elements at a prescribed cycle;
   an initialization signal outputting part that outputs an initialization signal to the timing signal outputting part at a timing for switching the light emission among the light-emitting elements, such that the timing signal outputting part activates another selected one of the plurality of light-emitting elements at the prescribed cycle.

2. The optical distance measuring sensor as claimed in claim 1, wherein a detection range is determined by a number of the light-emitting elements.

3. The optical distance measuring sensor as claimed in claim 1, wherein a viewing angle is determined by a distance between the light-emitting elements.

4. The optical distance measuring sensor as claimed in claim 1, wherein a detection range is determined by a distance between the light-emitting elements and the photodetector.

5. The optical distance measuring sensor as claimed in claim 1, further comprising:
   a light-permeable first sealing portion that seals the plurality of light-emitting elements; and
   a non-light-permeable second sealing portion that covers a portion of a surface of the first sealing portion other than a portion at which light paths extending from the plurality of light-emitting elements to the lens meet the surface of the first sealing portion.

6. The optical distance measuring sensor as claimed in claim 5, wherein
   the first sealing portion has lens-shaped portions through which light beams from the corresponding light-emitting elements go outward.

7. The optical distance measuring sensor as claimed in claim 1,
   wherein the distance signal outputting part outputs the distance signal in synchronization with the timing signal.

8. The optical distance measuring sensor as claimed in claim 7,
   wherein upon receipt of the initialization signal, the timing signal outputting part initializes the output of the timing signal, and
   wherein upon receipt of the initialization signal, the light emission driving part switches the light-emitting element that should be driven to emit light among the light-emitting elements.

9. The optical distance measuring sensor as claimed in claim 1, further comprising:
   a casing which is formed of a conductive material and in which at least the light-emitting elements, the photodetector, the light emission driving part and the distance signal outputting part are contained.

10. The optical distance measuring sensor as claimed in claim 9, further comprising:
    a board which has a grounding electrode and on which at least the light-emitting elements, the photodetector, the light emission driving part and the distance signal outputting part are mounted,
    wherein the grounding electrode of the board is electrically connected to the casing.

11. The optical distance measuring sensor as claimed in claim 1, further comprising:
    a pyroelectric sensor.

12. A self-propelled cleaner, comprising: the optical distance measuring sensor as claimed in claim 1.

* * * * *